US010845603B2

(12) United States Patent
Abe (10) Patent No.: US 10,845,603 B2
(45) Date of Patent: Nov. 24, 2020

(54) IMAGING ASSISTING DEVICE AND PROGRAM

(71) Applicant: Mitutoyo Corporation, Kanagawa (JP)

(72) Inventor: Shinsaku Abe, Hokkaido (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/591,724

(22) Filed: Oct. 3, 2019

(65) Prior Publication Data

US 2020/0132998 A1 Apr. 30, 2020

(30) Foreign Application Priority Data

Oct. 26, 2018 (JP) ................. 2018-201815

(51) Int. Cl.
*G02B 27/01* (2006.01)
*G06T 19/00* (2011.01)

(52) U.S. Cl.
CPC ........ *G02B 27/0172* (2013.01); *G06T 19/006* (2013.01); *G02B 2027/014* (2013.01)

(58) Field of Classification Search
CPC ..................................................... G06F 3/011
See application file for complete search history.

(56) References Cited

U.S. PATENT DOCUMENTS

| 9,798,143 | B2* | 10/2017 | Fujimaki | ............. G02B 27/017 |
| 2002/0101512 | A1* | 8/2002 | Klapman | ............... H04N 5/232 |
| | | | | 348/207.99 |
| 2018/0096531 | A1* | 4/2018 | Greenhalgh | ........ H04L 63/0861 |
| 2019/0089456 | A1* | 3/2019 | Kasilya Sudarsan | ... H04W 4/38 |
| 2019/0339058 | A1* | 11/2019 | Dryer | ..................... G06T 11/60 |

FOREIGN PATENT DOCUMENTS

JP 2016-186439 10/2016

* cited by examiner

*Primary Examiner* — Md Saiful A Siddiqui
(74) *Attorney, Agent, or Firm* — Rankin, Hill & Clark LLP (57) ABSTRACT

An imaging assisting device includes a head-mounted display unit worn to a head of a user, and a control unit configured to control the head-mounted display unit. The head-mounted display unit includes a frame worn to the head of the user and a display screen of transmissive type supported by the frame at a position where the display screen covers a field of view of the user in a state that the frame is worn by the user, the display screen being configured to display an object defined in a virtual space such that the object is superimposed on a real space. The control unit displays a guide graphic on the display screen as an object defined in the virtual space, the guide graphic indicating an imaging range of an imaging module.

6 Claims, 10 Drawing Sheets

IMAGING ASSISTING DEVICE AND PROGRAM

TECHNICAL FIELD

The present invention relates to an imaging assisting device facilitating recognition of an imaging range of an imaging module.

BACKGROUND ART

In recent years, with the spread of electronic equipment equipped with an imaging module such as a camera, various systems have been implemented that utilize images to perform various types of processing. For example, Patent Document 1 discloses a measurement data collection device that includes an imaging module configured to capture an appearance image of a target measuring tool representing measurement results; and a measurement reading module configured to read a measurement value from the appearance image of the target measuring tool captured by the imaging module. The measurement data collection device is capable of reading out the measurement value from the image.

CITATION LIST

Patent Literature

Patent Document 1: JP 2016-186439 A

SUMMARY OF INVENTION

Technical Problem

To cause the measurement data collection device described in Patent Document 1 to read out the measurement value, the measurement tool needs to be positioned within the imaging range of the imaging module. However, it is not easy for a user to accurately grasp the imaging range of the imaging module, and the measurement value may fail to be smoothly read out. This also applies to other systems utilizing images captured by the imaging module. Thus, when a subject is to be positioned within the imaging range of the imaging module, the user has difficulty in recognizing the imaging range of the imaging module.

In light of the foregoing, an object of the invention is to provide an imaging assisting device that allows the user to easily recognize the imaging range of the imaging module.

Solution to Problem

To solve the above problems, the invention provides an imaging assisting device including a head-mounted display unit worn to a head of a user; and a control unit configured to control the head-mounted display unit. The head-mounted display unit includes a frame worn to the head of the user and a display screen of transmissive type supported by the frame at a position where the display screen covers a field of view of the user in a state that the frame is worn by the user, the display screen being configured to display an object defined in a virtual space such that the object is superimposed on a real space. The control unit is configured to perform control to display a guide graphic on the display screen as an object defined in the virtual space, the guide graphic indicating an imaging range of an imaging module.

In the invention of the present application, the imaging module may be supported by the frame of the head-mounted display unit, and the control unit may be configured to perform control to display the guide graphic on the display screen such that the guide graphic is positioned at constant coordinates in a coordinate system for the virtual space based on the imaging module.

Alternatively, in the invention of the present application, in a case where a position, an attitude, and an angle of view of the imaging module are fixed in the real space where the imaging module is installed, the imaging assisting device may further include a position and attitude sensor configured to detect a position and an attitude of the head-mounted display unit, and the control unit may be configured to perform control, based on the position and the attitude of the head-mounted display unit detected by the position and attitude sensor, to display the guide graphic on the display screen such that the guide graphic is positioned at the constant coordinates in the coordinate system for the virtual space fixed with respect to the real space.

Alternatively, in the invention of the present application, in a case where at least one of a position, an attitude, and an angle of view of the imaging module is variable, the imaging assisting device may further include a position and attitude sensor configured to detect a position and an attitude of the head-mounted display unit, and control unit may be configured to acquire at least one of the position, the attitude, and the angle of view of the imaging module that is variable, calculate coordinates at which the guide graphic is to be displayed, based on the acquired at least one of the position, the attitude, and the angle of view of the imaging module, in the coordinate system for the virtual space fixed with respect to the real space, and perform control, based on the calculated coordinates in the virtual space at which the guide graphic is to be displayed and the position and the attitude of the head-mounted display unit detected by the position and attitude sensor, to display the guide graphic on the display screen such that the guide graphic is positioned at the calculated coordinates in the virtual space at which the guide graphic is to be displayed.

The imaging assisting device may further include an arrangement information acquisition unit configured to acquire arrangement information indicating arrangement of an object in the real space including the imaging range of the imaging module. Then, the control unit may be configured to perform control to identify a position of an imaging target object to be imaged based on the arrangement information and information indicating a shape of the imaging target object, and in a case where the imaging target object is not positioned within the imaging range, the control unit may be configured to perform control to display, on the display screen, navigation information for guidance of the imaging target object moving into the imaging range and/or alarm information indicating that the imaging target object is not positioned within the imaging range.

In addition, a program of the invention causes a computer to function as a control unit in any of the above-described imaging assisting devices.

DESCRIPTION OF EMBODIMENTS

Embodiments of the invention will be described hereinafter on the basis of the drawings.

First Embodiment

Figure 1:
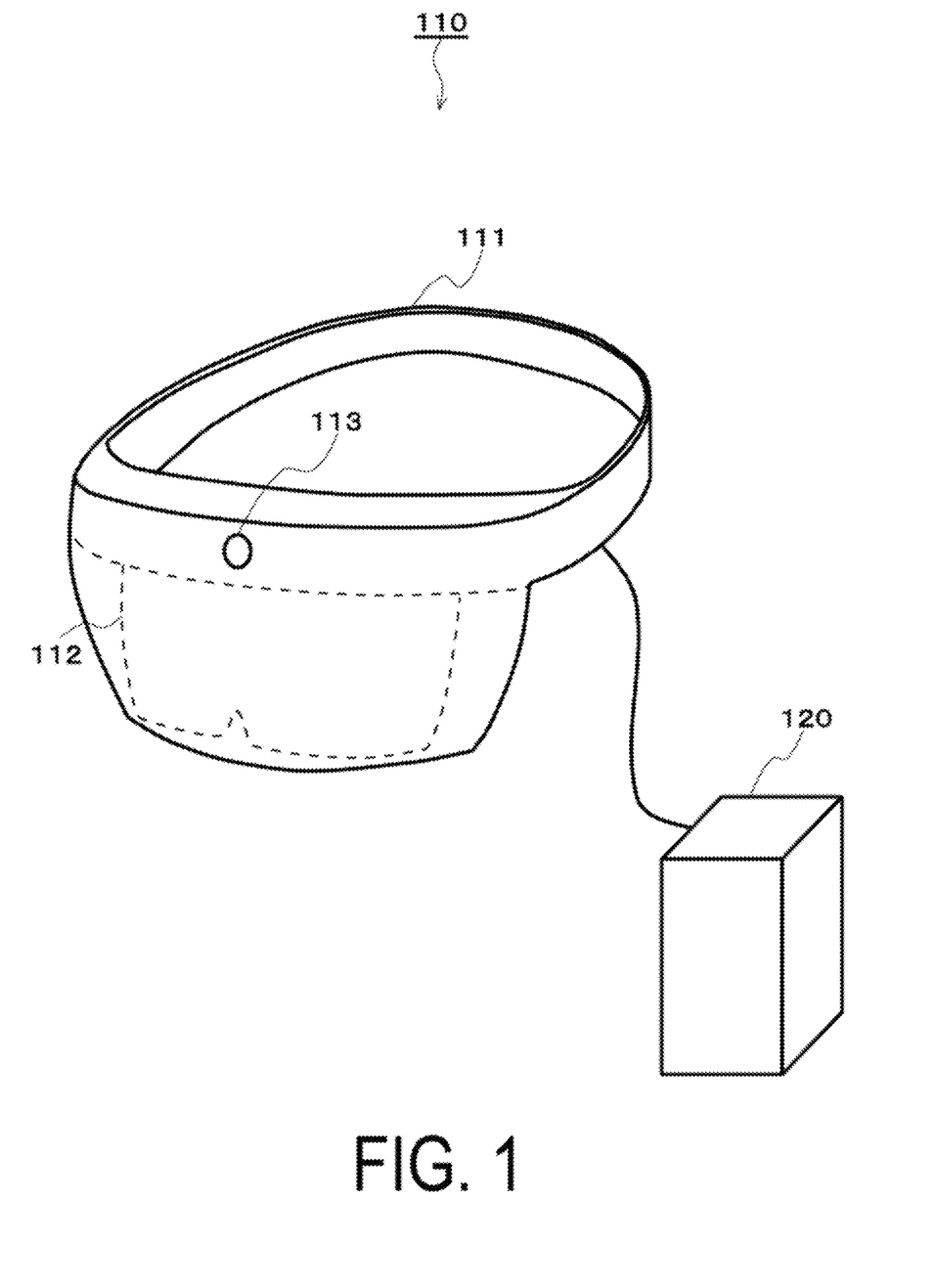
FIG. 1 is a schematic outline diagram illustrating a configuration of an imaging assisting device 100 according to a first embodiment.
Figure 2:
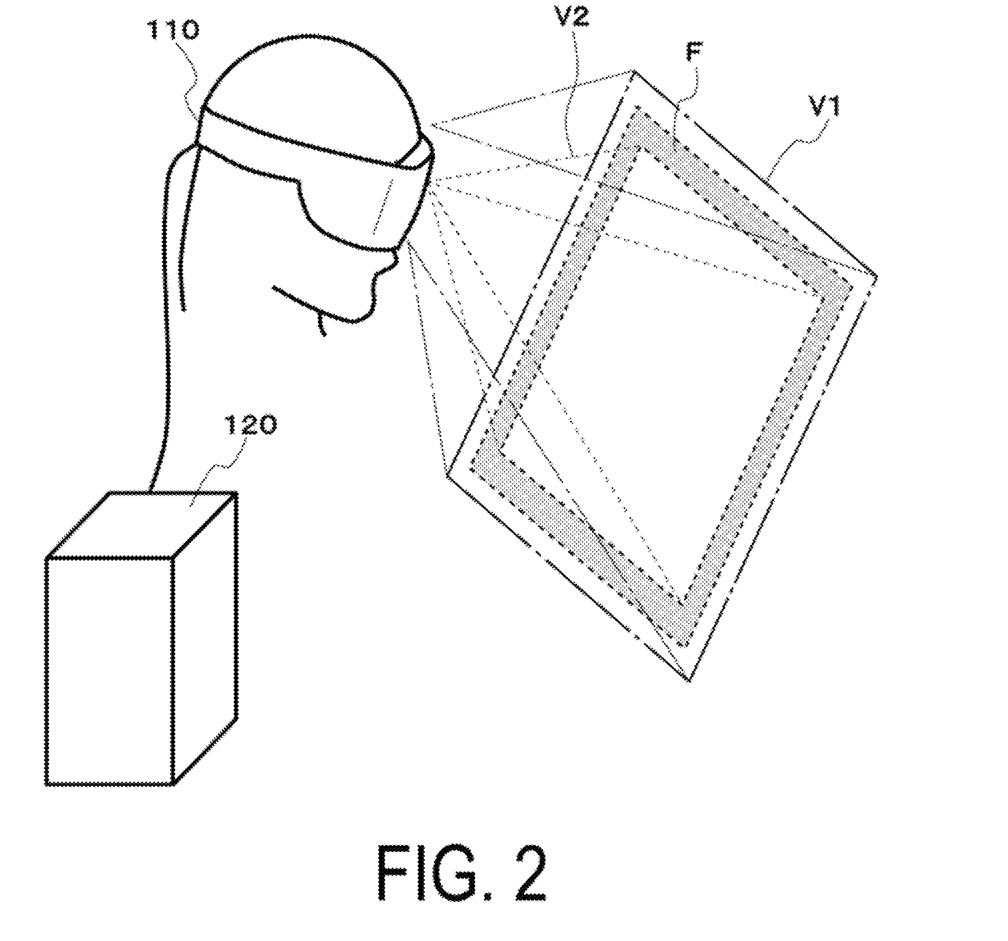
FIG. 2 is a schematic diagram illustrating a situation that a guide graphic F illustrating an imaging range V2 of a camera 113 is displayed in a field of view V1 of a user wearing an HMD unit 110.

FIG. 1 is a schematic outline diagram of a configuration of an imaging assisting device 100 according to a first embodiment. FIG. 2 is a schematic diagram illustrating a situation that a guide graphic F represents an imaging range V2 of a camera 113 is displayed in a field of view V1 of a user wearing an HMD unit 110. As illustrated in FIG. 1, the imaging assisting device 100 includes the head-mounted display unit 110 (hereinafter referred to as the HMD unit 110) and a control unit 120. The HMD unit 110 and the control unit 120 are communicatively connected together by wire or wireless.

The HMD unit 110 includes a frame 111, a display screen 112, and the camera 113. The frame 111 is worn to the head of a user using the HMD unit 110 to support the display screen 112 and the camera 113. The frame 111 is, for example, an eyeglasses type supported at both ears and the nose, a goggles type worn by the user by binding an elastic belt around the head, a helmet type worn by the user such that the frame is worn on the head, or the like. However, any type of the frame 111 may be used as long as the frame 111 can stably support the display screen 112 and the camera 113.

The display screen 112 is a display device of transmissive type configured to display a three-dimensional image and is provided at a position where the display screen 112 covers the field of view V1 while the HMD unit 110 is worn by the user. The user wearing the HMD unit 110 can view an object present in a real space through the display screen 112. In addition, the user can view an object three-dimensionally displayed on the display screen 112 as being present in a virtual space. Accordingly, the HMD unit 110 may provide the user with a mixed reality (MR) space in which an object present in the real space and an object present in the virtual space are superimposed on each other.

Using the HMD unit 110 as described above, the imaging assisting device 100 displays, on the display screen 112, the guide graphic F illustrating the imaging range V2 as an object in the virtual space.

The camera 113 corresponds to the imaging module in the invention and captures videos within the imaging range V2. The camera 113 may be a camera capturing moving images but may be a camera capturing still images. The camera 113 is provided near the center of the frame 111 to face a direction in which the front of the user wearing the HMD unit 110 is imaged. The imaging range V2 of the camera 113 is determined by characteristics of an optical system of the camera 113 and is a predetermined range based on the camera 113.

The control unit 120 controls display of an object defined by a coordinate system for the virtual space provided by the display screen 112. The control unit 120 is implemented by a computer including such as a CPU, a storage medium, and an input/output module by the CPU executing a program stored in the storage medium. In FIG. 2, the control unit 120 is connected to the HMD unit 110 by wire or wireless but may be configured integrally with the HMD unit 110.

As described above, the imaging range V2 is the predetermined range based on the camera 113, and thus, the control unit 120 uses a relative coordinate system based on the camera 113 as a coordinate system for the virtual space and displays the guide graphic F (for example, a rectangular frame) illustrating the imaging range V2 such that the guide graphic F is positioned at constant coordinates in the coordinate system. Here, since the camera 113 is fixed to the frame 111 of the HMD unit 110, in a case where the user wearing the HMD unit 110 on the head moves the head, the coordinate system based on the camera 113 also changes. However, since not only the camera 113 but also the display screen 112 is fixed to the frame 111 of the HMD unit 110, the display screen 112 does not move relative to the camera 113 and is always in place in the coordinate system based on the camera 113. Accordingly, the control unit 120 displays the guide graphic F illustrating the imaging range V2 such that the guide graphic F always appears at the same position within the field of view V1 that is visible through the display screen 112.

Figure 3A:
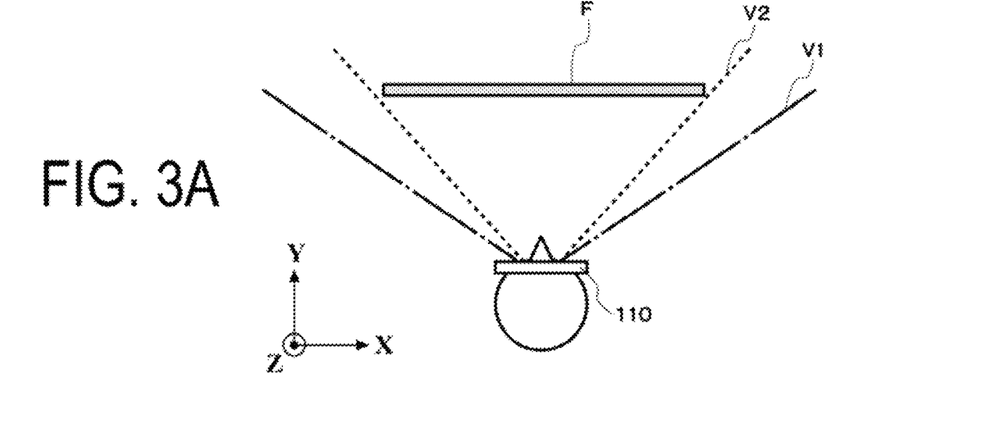
FIGS. 3A and 3B are schematic diagrams illustrating a relationship between the field of view V1 and the imaging range V2 according to a first embodiment.
Figure 3B:
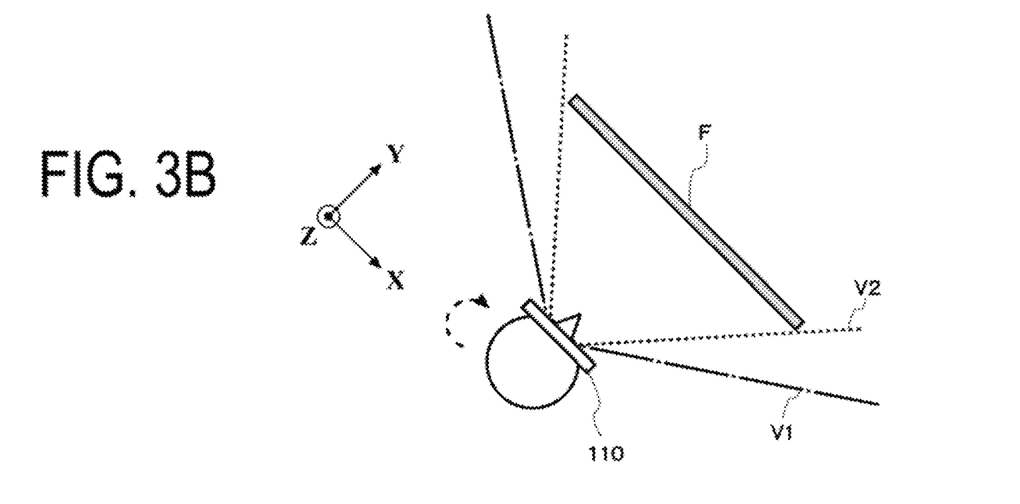

FIGS. 3A and 3B are schematic diagrams illustrating the relationship between the field of view V1 and the imaging range V2 in the first embodiment, as viewed from above the user (in a direction perpendicular to the sheet of the figure). The coordinate system based on a camera 113 is defined as illustrated in FIGS. 3A and 3B. That is, in the present embodiment, the coordinate system for the virtual space changes with respect to the real space in accordance with changes in the position and attitude of the camera 113 mounted in the HMD unit 110.

FIG. 3A illustrates the user wearing the HMD unit 110 and facing upward in the figure. In this state, the guide graphic F illustrating the imaging range V2 is displayed at a position located at a predetermined distance (for example, one meter) from the camera 113 in a Y-axis direction. The guide graphic F illustrating the imaging range V2 may be, for example, a frame of a closed curve extending along the contour of the imaging range V2 at the predetermined distance.

FIG. 3B illustrates a state that the user has changed the orientation of the head to the right with respect to the state in FIG. 3A. In a case where the user changes the orientation of the head, the coordinate system also changes as illustrated in FIG. 3B. However, the display screen 112 also changes the orientation similarly to the coordinate system, and thus, the guide graphic F illustrating the imaging range V2 positioned at the constant coordinates in the relative coordinate system based on the camera 113 remains displayed on the display screen 112 such that the guide graphic F appears at a constant position in the field of view V1 of the user.

The control unit controls the display of the display screen as described above to allow the user to visually recognize the imaging range of the camera mounted in the HMD unit.

Second Embodiment

Figure 4:
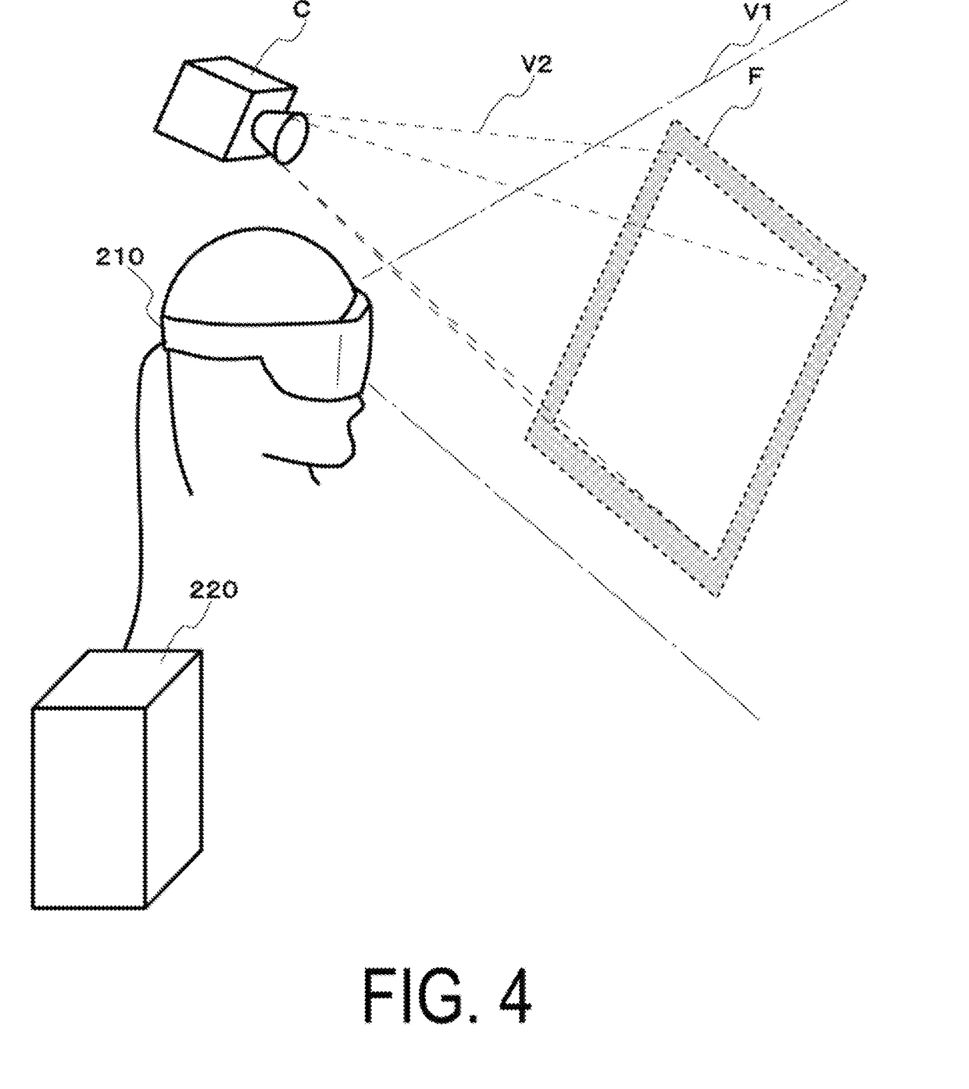
FIG. 4 is a schematic outline diagram illustrating a configuration of an imaging assisting device 200 according to a second embodiment.

FIG. 4 illustrates a schematic outline diagram of an imaging assisting device 200 according to a second embodiment. In the second embodiment, a camera C, the imaging range V2 of which is made visible by the imaging assisting device 200, is not incorporated in an HMD unit 210 and is fixed in a predetermined orientation at a predetermined position (e.g., on ceilings or a wall surface) of the real space in which the user wearing the HMD unit 210 stands. Additionally, the angle of view of the camera C is fixed. As illustrated in FIG. 4, the imaging assisting device 200 according to the second embodiment includes the HMD unit 210 and a control unit 220. The HMD unit 210 in the second embodiment differs from the HMD unit 110 in the first embodiment in that the HMD unit 210 includes no camera but a position and attitude sensor 214. However, the HMD unit 210 is otherwise configured similarly to the HMD unit 110, for example, the HMD unit 210 includes a display screen 212. Additionally, like the control unit 120 according to the first embodiment, the control unit 220 is implemented by a computer including a CPU, a storage medium, an input/output module. However, the control unit 220 differs from the control unit 120 in that the control unit 220 includes a function to control drawing of the guide graphic F illustrating the imaging range V2 based on the output of the position and attitude sensor 214.

The position and attitude sensor 214 is a sensor that detects the position and the attitude of the HMD unit 210. The position and attitude sensor 214 may be implemented by an acceleration sensor, a gyroscopic sensor, or the like. Note that the position and attitude sensor 214 may be provided separately from the HMD unit 210 instead of being incorporated in the HMD unit 210.

The camera C corresponds to the imaging module of the invention, and captures videos within the imaging range V2. The camera C may be a camera capturing moving images but may be a camera capturing still images. As described above, the camera C is fixed at the predetermined position in the real space (for example, on the ceiling or the wall surface). The imaging range V2 of the camera C is determined by the angle of view of the camera C and is a predetermined range based on the camera C.

Here, in a case where the user wearing the HMD unit 210 moves the head, the relative position of the guide graphic F with respect to the display screen 212 changes. Thus, the control unit 220 controls to update, as needed, drawing, on the display screen 212, of the guide graphic F illustrating the imaging range V2 based on the position and the attitude of the HMD unit 210 detected by the position and attitude sensor 214 and the coordinates of the guide graphic F such that the guide graphic F appears stationary at constant coordinates in a coordinate system for a virtual space fixed with respect to the real space in which the camera C is installed.

Figure 5A:
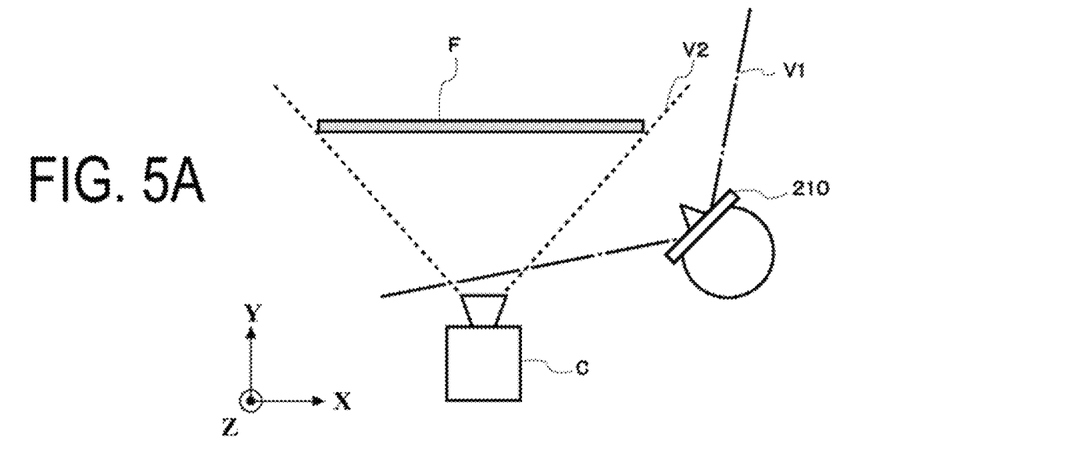
FIGS. 5A and 5B are schematic diagram illustrating a relationship between the field of view V1 and the imaging range V2 according to the second embodiment.
Figure 5B:
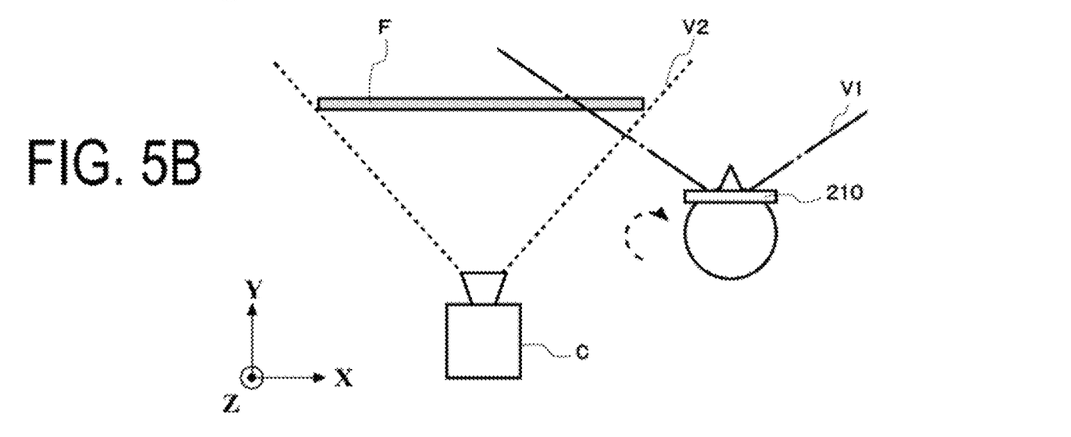

FIGS. 5A and 5B are schematic diagrams illustrating a relationship between the field of view V1 and the imaging range V2 according to the second embodiment as viewed from above the user (in a direction perpendicular to the sheet of the figures). As illustrated in FIGS. 5A and 5B, the coordinate system for the virtual space is defined with reference to a predetermined position in the real space at which the camera C is installed. In other words, in the present embodiment, the coordinate system for the virtual space is a coordinate system fixed with respect to the real space regardless of changes in the position and attitude of the HMD unit 110.

In FIG. 5A, the camera C is arranged to face upward in the figure, and the user wearing the HMD unit 210 is positioned on the right side of the camera C, facing the upper left in the figure. Since the camera C is fixed with respect to the real space, the guide graphic F is defined at constant position coordinates in the coordinate system for the virtual space. In accordance with the position and attitude of the HMD unit 210, the guide graphic F illustrating the imaging range V2 is displayed on the display screen 212 of the HMD unit 210 such that the guide graphic F is positioned at a predetermined distance (for example, one meter) from the camera C. The guide graphic F illustrating the imaging range V2 may be, for example, a frame of a closed curve extending along the contour of the imaging range V2 at the predetermined distance.

In FIG. 5B, the user has turned the head to the right with respect to the state of FIG. 5A to face upward in the figure. Since the camera C is fixed with respect to the real space, the position at which the guide graphic F is to be displayed remains unchanged even in a case where the user changes the orientation of the head. On the other hand, the display screen 212 changes the orientation similarly to the head of the user. Thus, the field of view V1 of the user through the display screen 212 changes. However, the guide graphic F remains displayed on the display screen 112 in accordance with the position and attitude of the HMD unit 210 to appear stationary at a constant position in the fixed coordinate system with respect to the real space.

The display control based on the position and the attitude of the HMD unit 210 as described above allows the user to visually recognize the imaging range V2 of the camera C fixedly installed with respect to the real space.

Third Embodiment

Figure 6:
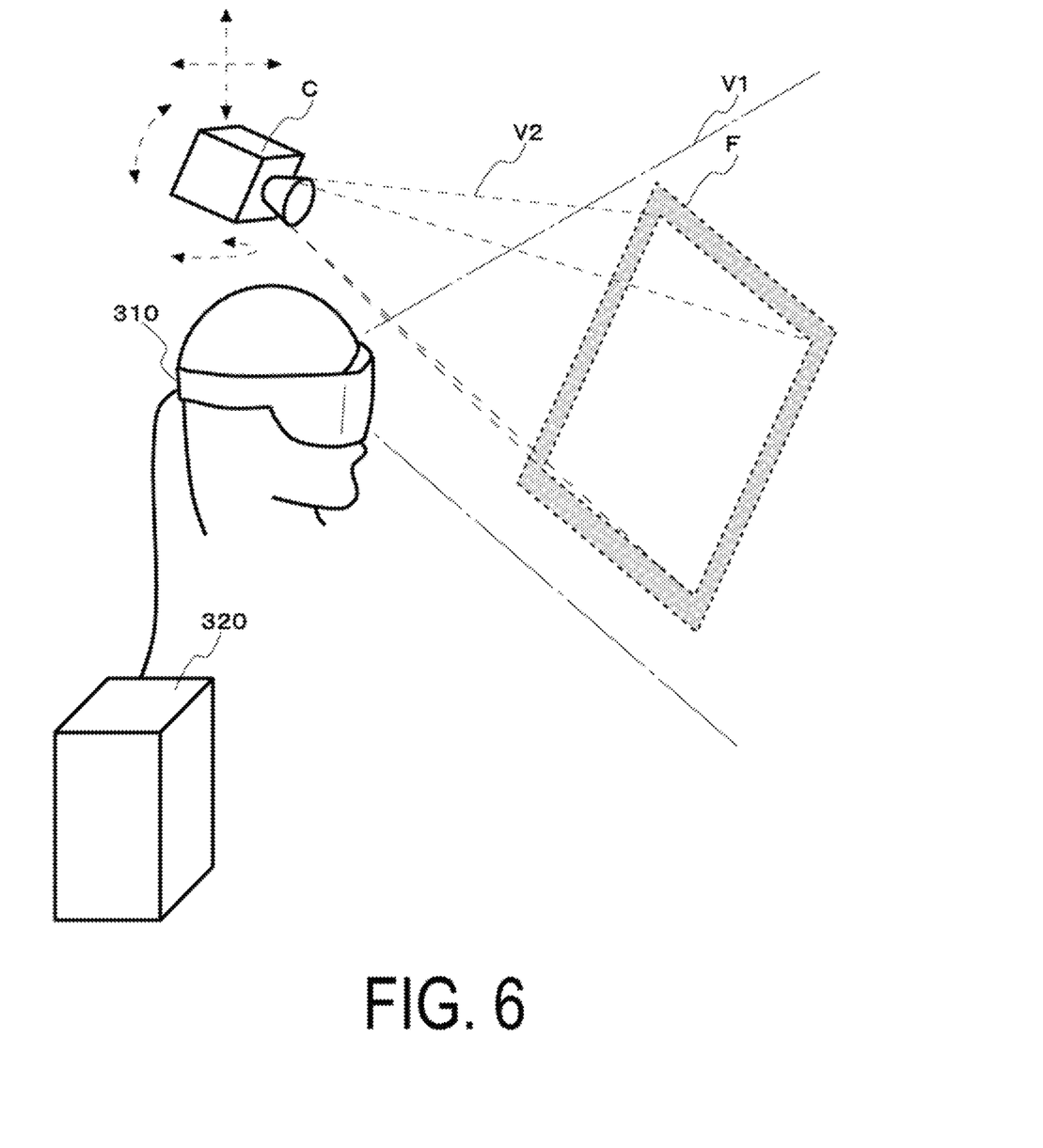
FIG. 6 is a schematic outline diagram illustrating a configuration of an imaging assisting device 300 according to a third embodiment.

FIG. 6 illustrates a schematic outline diagram of an imaging assisting device 300 according to a third embodiment. In the third embodiment too, the camera C, the imaging range V2 of which is made visible by the imaging assisting device 300, is not incorporated in an HMD unit 310. However, unlike in the second embodiment, the camera C is configured to be capable of changing at least one (hereinafter referred to as the "position and the like") of the position, the attitude, and the angle of view. The position and the like of the camera C may be configured to be changed by automatic control or external operation. As illustrated in FIG. 6, the imaging assisting device 300 according to the third embodiment includes the HMD unit 310 and a control unit 320 similarly to the imaging assisting device according to the second embodiment. The HMD unit 310 is configured similarly to the HMD unit 210 in the second embodiment in that, for example, the HMD unit 310 includes a display screen 312 and a position and attitude sensor 314. In addition, like the control unit 120 in the first embodiment, the control unit 320 is implemented by a computer including a CPU, a storage medium, and an input/output module. However, the control unit 320 differs from the control unit 120 in that the control unit 320 includes a function to control drawing of the guide graphic F based on the position and the like of the camera C as well as the position and the attitude of the HMD unit 310.

In order to achieve such a drawing, the control unit 320 acquires the position and the like of the camera C. The position and the like of the camera C may be acquired detected value from a sensor incorporated in the camera C or may be acquired from equipment or program that controls the position and the like of the camera C. Alternatively, the position and the like of the camera C may be acquired by tracking with an 3D sensor or the like.

As described above, the camera C is not incorporated in the HMD unit 310 and is configured to change in position and the like. The imaging range V2 of the camera C is determined by characteristics of an optical system of the camera and is a predetermined range based on the camera C. For this reason, the control unit 320 calculates coordinates at which the guide graphic F (for example, a rectangular frame) illustrating the imaging range V2 is displayed in response to changes in the position, the attitude, and the angle of view of the camera C.

In addition, in a case where the user wearing the HMD unit 310 moves the head, the position of the guide graphic F relative to the display screen 312 changes. Thus, the control unit 320 controls to update, as needed, drawing, on the display screen 312, of the guide graphic F illustrating the imaging range V2 based on the position and the attitude of the HMD unit 310 detected by the position and attitude sensor 314; and the coordinates calculated based on the position and the like of the camera C, at which the guide graphic F is to be displayed. The updating is performed such that the guide graphic F illustrating the imaging range V2 of the camera C appears to follow changes in the position and the like of the camera C.

Figure 7A:
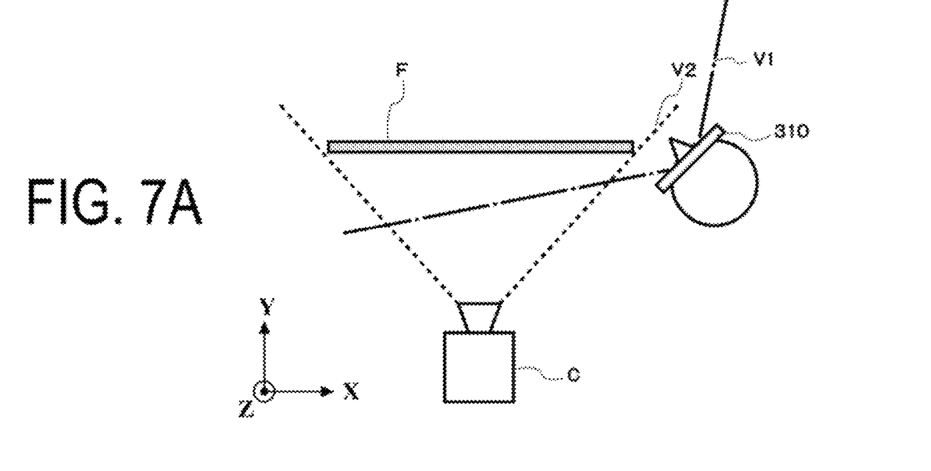
FIGS. 7A and 7B are schematic diagrams illustrating a relationship between the field of view V1 and the imaging range V2 according to the third embodiment.
Figure 7B:
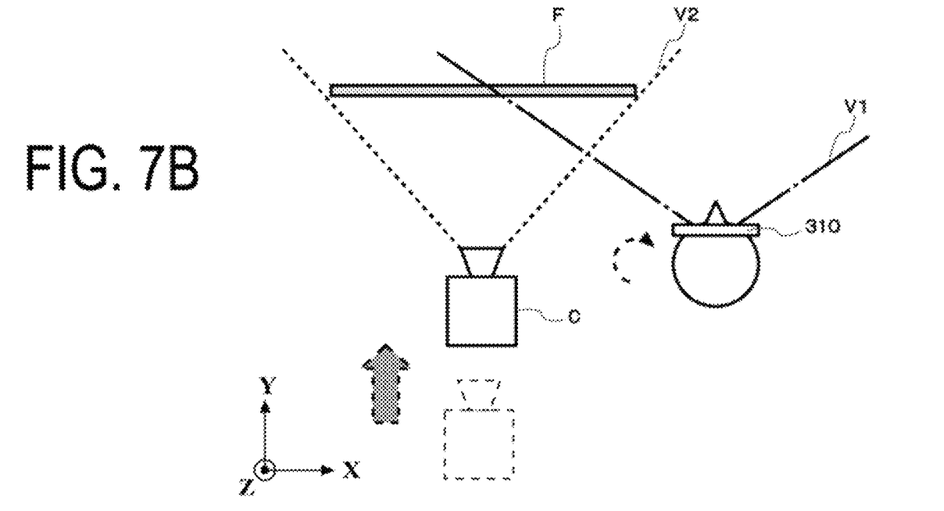

FIGS. 7A and 7B are schematic diagrams illustrating the relationship between the field of view V1 and the imaging range V2 according to the third embodiment, from above the user (in the direction perpendicular to the sheet of the figures). As illustrated in FIG. 7A and FIG. 7B, a coordinate system for a virtual space is defined with reference to a predetermined position in the real space. In other words, in the present embodiment, the coordinate system for the virtual space is a coordinate system fixed with respect to the real space regardless of changes in the position and attitude of the HMD unit 110 and the position and the like of the camera C.

In FIG. 7A, the camera C is positioned behind a user wearing the HMD unit 310, and the user faces the upper left in the figure. The coordinates in the virtual space at which the guide graphic F is to be displayed are determined based on the position of the camera C. In accordance with the position and attitude of the HMD unit 310, the guide graphic F illustrating the imaging range V2 is displayed on the display screen 312 of the HMD unit 310 such that the guide graphic F lies at a position (for example, a position located a predetermined distance away from the camera C) determined by the position of the camera C. The guide graphic F illustrating the imaging range V2 may be, for example, a frame of a closed curve extending along the contour of the imaging range V2 at the predetermined distance.

In FIG. 7B, the camera C has moved forward with respect to the state in FIG. 7A, and the user has turned the head to the right to face upward in the figure. The position at which the guide graphic F is to be displayed changes in accordance with changes in the position and the like of the camera C. The display screen 312 changes the orientation similarly to the orientation of the head of the user, thus changing the field of view V1 of the user through the display screen 312. In response to these changes, the control unit 320 calculates, based on the position and the like of the camera, the position at which the guide graphic F illustrating the imaging range V2 is to be displayed and controls display of the guide graphic F on the display screen 312 in accordance with the position and attitude of the HMD unit 310. As a result, the guide graphic F is displayed on the display screen 112 such that the position, the attitude, the shape, and the like of the guide graphic F appear to change following changes in the position and the like of the camera C.

Due to the display control based on the attitude and the like of the camera C and the position and attitude of the HMD unit 310 as described above, the user can visually recognize the imaging range V2 of the camera C, the position and the like of which are to be changed.

Fourth Embodiment

The imaging assisting devices in the first to third embodiments are configured to visualize the imaging range of the camera by displaying the guide graphic F. An imaging assistance device 400 in the fourth embodiment includes a function to guide and position an imaging target object in the imaging range as well as to visualize the imaging range.

Figure 8:
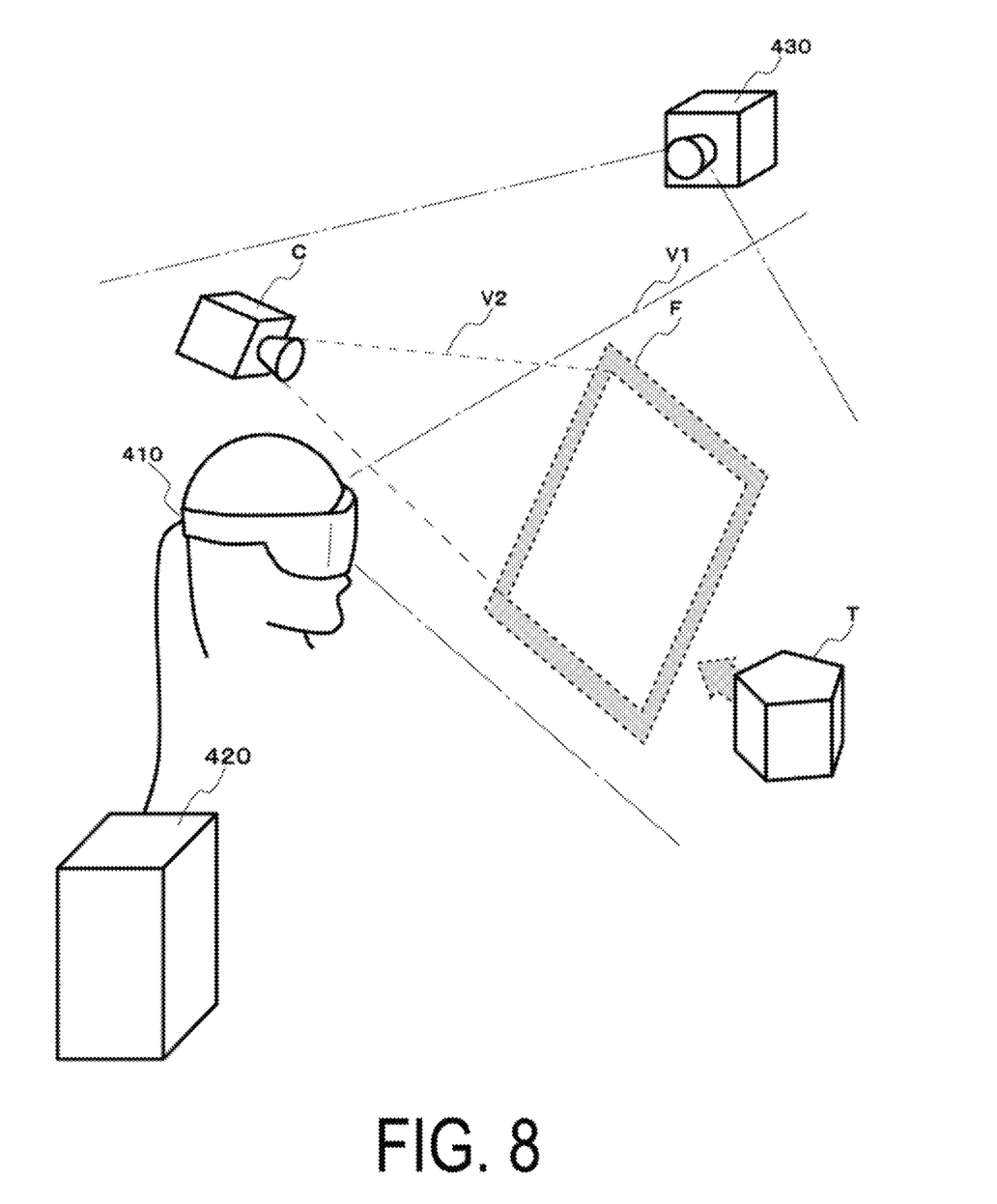
FIG. 8 is a schematic outline diagram illustrating a configuration of an imaging assisting device 400 according to a fourth embodiment.

FIG. 8 illustrates a schematic outline diagram of the imaging assisting device 400 according to the fourth embodiment. The imaging assisting device 400, like the imaging assisting device 200 in the second embodiment, includes an HMD unit 410 and a main unit 420. The camera C, the imaging range V2 of which is made visible by the imaging assisting device 400, is not incorporated in the HMD unit 410 and is fixed in a predetermined orientation at a predetermined position (e.g., on the ceilings or the wall surface) of the real space in which the user wearing the HMD unit 410 stands. The HMD unit 410 is configured similarly to the HMD unit 210 in the second embodiment in that, for example, the HMD unit 410 includes a display screen 412 and a position and attitude sensor 414. In addition, like the control unit 220 in the second embodiment, the control unit 420 is implemented by a computer including a CPU, a storage medium, and an input/output module.

In addition to the HMD unit 410 and the main unit 420, the imaging assisting device 400 includes an arrangement information acquisition unit 430 acquiring arrangement information indicating the arrangement of an object in the real space including the imaging range V2 of the camera C. The arrangement information acquisition unit 430 and the control unit 420 are communicatively connected together by wire or wireless. As the arrangement information acquisition unit 430, a camera that is different from the camera C capturing images of the real space in which the camera C is arranged, a 3D sensor that acquires point cloud data indicating the position of an object in the space in which the camera C is arranged, or the like can be used. In the present example, the arrangement information acquisition unit 430 is arranged separately from the HMD unit 410 but may be incorporated in the HMD unit 410. For matching with data acquired by the arrangement information acquisition unit 430, information regulating the shape of an imaging target object T to be imaged by the camera C (for example, an appearance image of the imaging target object T or a three-dimensional model) is recorded in advance in the control unit 420, and the control unit 420 analyzes the arrangement information acquired by the arrangement information acquisition unit 430 and identifies the position of the imaging target object T in the real space.

Like the imaging assisting device 200 in the second embodiment, the imaging assisting device 400 controls to update, as needed, drawing, on the display screen 412, of the guide graphic F illustrating the imaging range V2 based on the position and the attitude of the HMD unit 210 and the coordinates of the guide graphic F such that the guide graphic F appears stationary at constant coordinates in a coordinate system for a virtual space fixed with respect to the real space in which the camera C is installed. This allows the user to visually recognize the imaging range V2 of the camera C.

Figure 9:
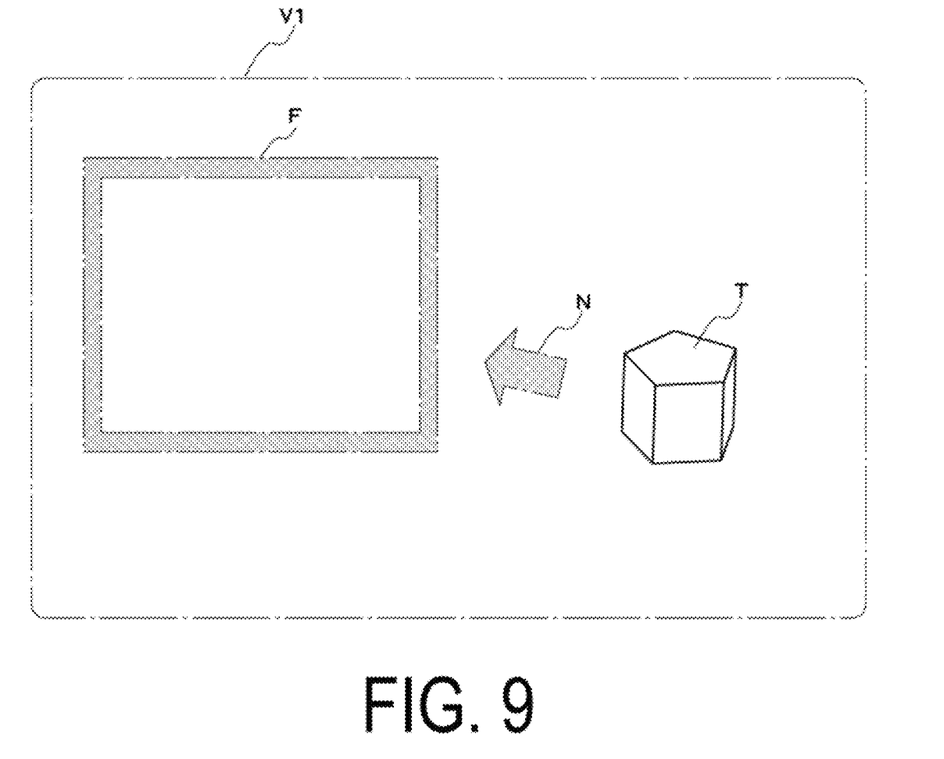
FIG. 9 is a diagram illustrating an example of the field of view V1 of a user according to the fourth embodiment.

In addition, the imaging assisting device 400 identifies the position of the imaging target object T based on the arrangement information acquired by the arrangement information acquisition unit 430 and determines whether the imaging target object T is positioned within the imaging range V2 of the camera C or not. Then, in a case where the imaging target object T is not positioned within the imaging range V2, the imaging assisting device 400 presents, to the user, navigation information for guidance of the imaging target object T moving into the imaging range V2 and/or alarm information indicating that the imaging target object T is outside the imaging range V2. A method for presenting such information to the user is optional. However, for example, as illustrated in FIG. 9, a graphic N (e.g., an arrow) indicating a direction in which the imaging target object T is to be moved may be displayed on the display screen 412 as navigation information. In addition to such visual information, navigation information and alarm information may be presented as audio information such as voice, haptic information such as vibration, and the like.

According to the configuration described above, the imaging assisting device 400 according to the fourth embodiment is cable of more actively encouraging the user to quickly position the imaging target object T within the imaging range as well as displaying the guide graphic F. Note that, in the fourth embodiment described above, the system in which the camera C is fixed in a space similar to the space in the second embodiment has been described as an example but that even in a system in which the camera C changes in position and the like as in the case of the third embodiment and in a system in which the camera is incorporated in the HMD unit as in the case of the first embodiment, the imaging range V2 and the position of the imaging target object T may each be identified, and based on a positional relationship between the imaging range V2 and the position of the imaging target object T, the navigation information and the alarm information may be presented.

Variations on Embodiments

Note that the invention is not limited to the foregoing embodiments, and variations, improvements, and the like that are within a scope in which the object of the invention can be achieved are included within the invention. For example, display modes (display/hide, display color, and the like) of the guide graphic F may be changed in accordance with the operating state of the camera (whether or not an image is being captured).

Additionally, in the embodiments described above, the distance from the camera to the position where the graphic is displayed is constant. However, the distance from the camera to the position where the graphic is displayed may be variable. For example, the distance from the camera to the position where the guide graphic F is to be displayed may be set by the user. Alternatively, the guide graphic F may be displayed at a focused distance of the camera.

Additionally, in the embodiments described above, the case where a rectangular frame is displayed as the shape of the guide graphic F has been described as an example.

Figure 10:
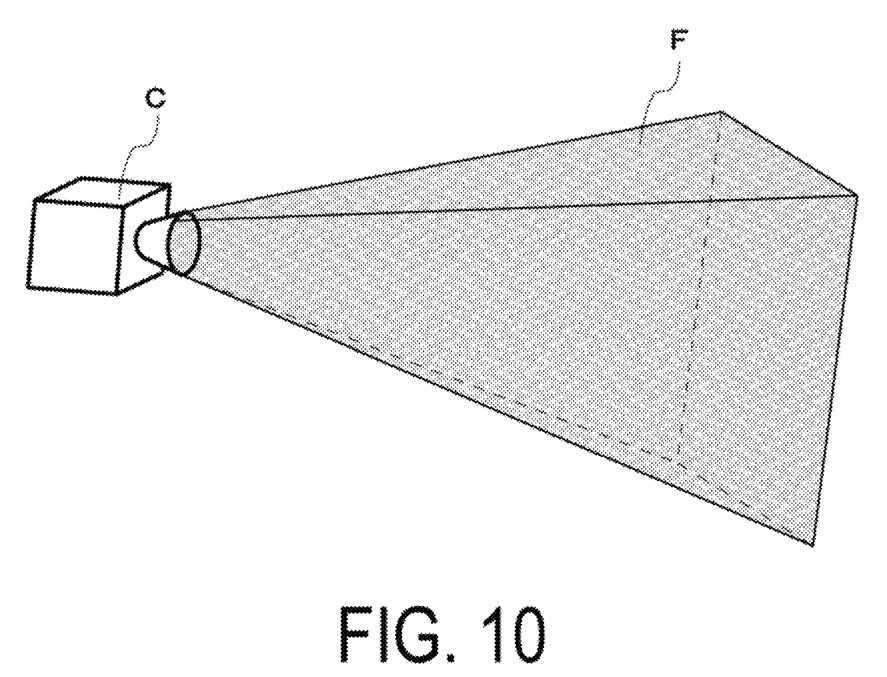
FIG. 10 is a diagram illustrating a modified example of the guide graphic F.

However, the shape of the guide graphic F is not limited to this. For example, as illustrated in FIG. 10, a square pyramid including an apex corresponding to the camera and side surfaces corresponding to the ends of the imaging range of the camera may be drawn as the guide graphic F. Alternatively, a figure corresponding to the above-described square pyramid except for a portion on which the camera fails to focus (e.g., a square pyramidal frustum corresponding to the above-described square pyramid except for the vicinity of the apex close to the camera) may be drawn as the guide graphic F. Additionally, a portion of the above-described square pyramid on which the camera is focused may be drawn as the guide graphic F. Drawing the guide graphic F in this way enables the user to three-dimensionally grasp the imaging range V2.

In the embodiment described above, the case where the guide graphic F illustrating the imaging range V2 is displayed at the position located the predetermined distance away from the camera has been described as an example, but the distance from the camera to the graphic may be variable. For example, the user may set the position where the graphic is to be displayed.

In addition, in the second and third embodiments described above, the position and the attitude of the HMD unit are acquired by the sensor incorporated in the HMD unit. However, the position and the attitude of the HMD unit may be acquired by a 3D sensor or the like that is externally installed.

In addition, in the fourth embodiment, in a case where an image is captured even though the object is not positioned within the imaging range, an indication that the target object is not included in imaging results may be composited into an image captured by the camera.

The embodiments described above or specific examples thereof to which a person skilled in the art has made appropriate component addition, removal, and design change may be included in the scope of the invention as long as the embodiments or examples include the gist of the invention.

REFERENCE SIGNS LIST 100, 200, 300, 400 Imaging assisting device
110, 210, 310, 410 HMD Unit
120, 220, 320, 420 Control Unit
430 Arrangement information acquisition unit
C Camera
F Guide graphic
V1 Field of view of user
V2 Imaging range

The invention claimed is:

1. An imaging assisting device comprising:
a head-mounted display unit worn to a head of a user;
a control unit configured to control the head-mounted display unit; and
a position and attitude sensor configured to detect a position and an attitude of the head-mounted display unit, wherein
the head-mounted display unit includes
a frame worn to the head of the user, and
a display screen of transmissive type supported by the frame at a position where the display screen covers a field of view of the user in a state that the frame is worn by the user, the display screen being configured to display an object defined in a virtual space such that the object is superimposed on a real space, the control unit is configured to perform control to display a guide graphic on the display screen as an object defined in the virtual space, the guide graphic indicating an imaging range of an imaging module, the imaging module is not incorporated in the head-mounted display unit, a position, an attitude, and an angle of view of the imaging module are fixed in a real space where the imaging module is installed, and the control unit is configured to perform control, based on the position and the attitude of the head-mounted display unit detected by the position and attitude sensor, to display the guide graphic on the display screen such that the guide graphic is positioned at the constant coordinates in the coordinate system for the virtual space fixed with respect to the real space.

2. The imaging assisting device according to claim 1 further comprising an arrangement information acquisition unit configured to acquire arrangement information indicating arrangement of an object in the real space including the imaging range of the imaging module, wherein the control unit is configured to perform control to identify a position of an imaging target object to be imaged based on the arrangement information and information indicating a shape of the imaging target object, and in a case where the imaging target object is not positioned within the imaging range, the control unit is configured to perform control to display, on the display screen, navigation information for guidance of the imaging target object moving into the imaging range and/or alarm information indicating that the imaging target object is not positioned within the imaging range.

3. A non-transitory computer-readable medium storing a program for causing a computer to function as a control unit in the imaging assisting device described in claim 1.

4. An imaging assisting device comprising:

a head-mounted display unit worn to a head of a user;

a control unit configured to control the head-mounted display unit; and a position and attitude sensor configured to detect a position and an attitude of the head-mounted display unit, wherein the head-mounted display unit includes a frame worn to the head of the user, and a display screen of transmissive type supported by the frame at a position where the display screen covers a field of view of the user in a state that the frame is worn by the user, the display screen being configured to display an object defined in a virtual space such that the object is superimposed on a real space, the control unit is configured to perform control to display a guide graphic on the display screen as an object defined in the virtual space, the guide graphic indicating an imaging range of an imaging module, the imaging module is not incorporated in the head-mounted display unit, at least one of a position, an attitude, and an angle of view of the imaging module is variable, and the control unit is configured to acquire at least one of the position, the attitude, and the angle of view of the imaging module that is variable, calculate coordinates at which the guide graphic is to be displayed, based on the acquired at least one of the position, the attitude, and the angle of view of the imaging module, in the coordinate system for the virtual space fixed with respect to the real space, and perform control, based on the calculated coordinates in the virtual space at which the guide graphic is to be displayed and the position and the attitude of the head-mounted display unit detected by the position and attitude sensor, to display the guide graphic on the display screen such that the guide graphic is positioned at the calculated coordinates in the virtual space at which the guide graphic is to be displayed.

5. The imaging assisting device according to claim 4 further comprising an arrangement information acquisition unit configured to acquire arrangement information indicating arrangement of an object in the real space including the imaging range of the imaging module, wherein the control unit is configured to perform control to identify a position of an imaging target object to be imaged based on the arrangement information and information indicating a shape of the imaging target object, and in a case where the imaging target object is not positioned within the imaging range, the control unit is configured to perform control to display, on the display screen, navigation information for guidance of the imaging target object moving into the imaging range and/or alarm information indicating that the imaging target object is not positioned within the imaging range.

6. A non-transitory computer-readable medium storing a program for causing a computer to function as a control unit in the imaging assisting device described in claim 4.

* * * * *